Sept. 26, 1961  H. BROSCHKE  3,001,460
EXPOSURE METER FOR PHOTOGRAPHIC OR CINEMATOGRAPHIC PURPOSES
Filed July 16, 1958  5 Sheets-Sheet 1

INVENTOR.
Heinrich Broschke
BY

Sept. 26, 1961 H. BROSCHKE 3,001,460
EXPOSURE METER FOR PHOTOGRAPHIC OR CINEMATOGRAPHIC PURPOSES
Filed July 16, 1958 5 Sheets-Sheet 2

INVENTOR.
Heinrich Broschke
BY

Sept. 26, 1961   H. BROSCHKE   3,001,460
EXPOSURE METER FOR PHOTOGRAPHIC OR CINEMATOGRAPHIC PURPOSES
Filed July 16, 1958   5 Sheets-Sheet 3

INVENTOR.
Heinrich Broschke
BY

INVENTOR.
Heinrich Broschke
BY

United States Patent Office 3,001,460
Patented Sept. 26, 1961

3,001,460
EXPOSURE METER FOR PHOTOGRAPHIC OR CINEMATOGRAPHIC PURPOSES
Heinrich Broschke, Wetzlar (Lahn), Germany, assignor to Ernst Leitz, G.m.b.H., Wetzlar, Germany, a corporation of Germany
Filed July 16, 1958, Ser. No. 748,837
Claims priority, application Germany July 20, 1957
13 Claims. (Cl. 95—10)

This invention relates to a method and to an apparatus for ascertaining the correct illumination or exposure measurement to be observed in taking photographic or cinematographic pictures by using an exposure measuring device which consists of a combination of an optical photometer and a photoelectric exposure meter.

Such combinations are per se known in the art. In such combinations it is known to ascertain the correct optical-photometric exposure value by a comparison between a small, sharply defined view-portion of the object and a comparison surface and to measure the brightness of the comparison surface by a photoelectric exposure meter, the light value ascertained by said optical photometer being used as a computing factor for the light value ascertained by said photoelectric meter.

Inasmuch as the object to be photographed as a rule contains a very uneven division of dark and bright portions it may easily happen that the brightness of a very unimportant portion of the object may be compared with the comparison surface, so that a faulty exposure of important details of the object may occur. This may easily happen when the distance to the object is considerable and measuring near the object is impossible. The necessity of combining both light values by computing may cause faulty results and prevent a direct coupling between the exposure measuring device and the exposure setting devices of a photographic or cinematographic camera.

The invention avoids such disadvantages and makes possible the direct coupling between such combined measuring devices and the exposure setting means of a photographic or cinematographic camera.

Therefore, an object of the invention is a method of measuring the illumination necessary for photographing an object by the use of an optical comparison photometer together with a photoelectric exposure meter for photoelectric measuring the comparison brightness, which method consists in—

First, determining the integral value of the brightness of a view-important portion of the object by said optical photometer, said portion of the object being of an optically predeterminated size;

Second, transferring said determinated integral brightness value as a correction value upon the follow up pointer of said photoelectrical exposure meter, the instrument pointer of which indicates the light value of the comparison brightness of the said optical photometer and Third, thereafter adjusting the exposure setting elements of the camera in accordance with the follow up position of the said follow up pointer which has been corrected by the correction value ascertained by the said optical photometer.

A further object of the invention is to provide an exposure meter device for determining the requisite illumination for the photographic taking of pictures according to the aforesaid method, comprising, in combination, an optical comparison photometer for determining the light value of a view-important portion of the object to be photographed, a photoelectric exposure meter for photo electrically determining the comparison brightness of said optical photometer, a picture finder for observing the object and showing the size of the object to be photographed, optical means in said picture finder for viewing the field of view of said optical comparison photometer in the path of the finder bundle of light rays, optical means in said optical comparison photometer for producing a non-sharp image of predeterminated size of a view-important portion of the object in the field of view of the comparison photometer concentric with the comparison light spot of the comparison photometer, light-weakening means in said comparison photometer, a scale connected to said light weakening means, means in said photoelectric exposure meter for stopping or loosening, respectively, the pointer of the photoelectric instrument in its stroke position in dependence upon the measuring operation of said optical comparison photometer, a follow up pointer device in said photoelectric meter adjustable with reference to the light values ascertained by said optical photometer and provided with means indicating the camera setting values, and means for illuminating evenly the comparison surface of the optical comparison surface of the optical comparison photometer and the photo cell of the photoelectric exposure meter.

Furthermore, objects of the invention are to provide coupling means for mechanically transferring the correction value ascertained from the optical comparison photometer to the photoelectric exposure meter or its follow up pointer, respectively, and means for direct coupling between the scale means of the photoelectric exposure meter and the exposure setting means of a camera, including equalizing means to consider the non-linear characteristics of the pointer movement of the said photoelectric exposure meter.

The aforesaid and further objects of this invention will be more readily understood from the following specification read in connection with the accompanying drawings, in which.

The embodiment of the invention illustrated in FIGS. 1–5 comprises a housing 60 having a front wall with a light diffusing glass plate 1 and including an optical comparison photometer as well as a photoelectric exposure meter and a view finder 4, 5, the latter being combined with the optical photometer.

The photoelectric exposure meter comprises a photo cell 2 arranged behind the diffusing glass plate 1 and electrically connected with an instrument 50a, the pointer 50 of which is visible in a window 60b of the housing 60 opposite a leading scale 51. Additional scale means 52, 53 and 54 are provided for cooperating with the leading scale 51 and the pointer 50, respectively, as later on described.

The optical photometer comprises an opening 3 behind the diffusing glass plate 1 provided for the passage of the comparison rays of light of the optical photometer, towards a small comparison surface formed as a small mirror element 9b, which is arranged in an optical mixing element 9. By this arrangement, the comparison surface 9b of the optical photometer and the photo cell 2 of the photoelectric meter receive light from the same source, namely from the illuminated diffusing glass plate 1.

Furthermore, the optical photometer comprises a tube 10a with an opening 10 in the diffusing glass plate 1 through which enters a bundle of light rays 7 coming from the object the exposure value of which has to be measured. The incoming light rays 7 are reflected by an inclined mirror 8 to the surface 9a of the optical mixing element 9, the surface 9a being matted and serving as a ground glass, the free area of the matted surface 9a being defined by a diaphragm 11.

The angle of the bundle of rays which enters through the opening 10 is dimensioned to be an integral division of the entrance angle of the finder 4, 5. The opening 10 and the opening in the diaphragm 11 may be dimensioned to suit the use of objectives with different focus and these openings may be adjusted or made interchangeable. These and other details are not illustrated.

The optical proportions of the finder 4, 5 are so selected that the finder may be usable for a photographic or cinematographic camera. If camera objectives with different focus are used, the picture field appearing in the finder may be made adjustable or coupled to a corresponding adjusting means for limiting the measuring field.

The finder 4, 5 is provided with an inclined mirror 6, arranged between the finder lenses to receive light rays coming from the mirror element 9b and from the matted surface 9a and to reflect these light rays towards the ocular lens 5 of the finder. Between the optical mixing element 9 and the mirror 6 there is arranged a lens 12, which serves together with the finder lens 5 to observe the mirror 9b and the matted surface 9a.

Figure 1:
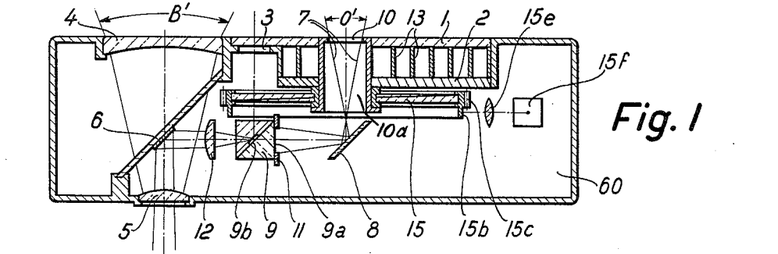
FIGS. 1–4 illustrate an optical-photoelectrical measuring device embodying the invention in which the viewing field of the photometer is mirrored in a picture finder, the viewing field of the latter shows the part of an object, which may be photographed by means of a photographic camera, not shown.
Figure 5:
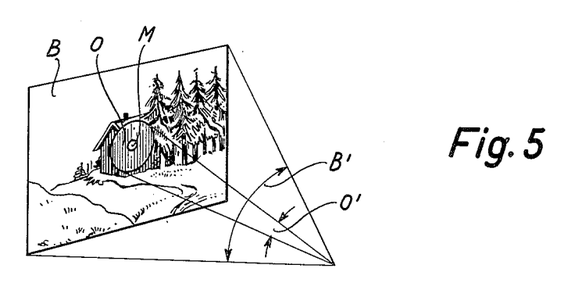
FIG. 5 shows the viewing field of the finder with the viewing field of the photometer, according to the embodiment of FIGS. 1–4.

The size of the mirror 9b and the size of the free area of the matted surface 9a are so selected that, visible in the viewing field B of the finder 4, 5, the adjustable field of comparison which corresponds to the size of the mirror 9b is seen as a small field M in the middle of a much larger field O corresponding in size to the opening in the diaphragm 11, the field O, however, is small in comparison with the viewing field B of the finder 4, 5, as shown in FIG. 5 and marked in FIGS. 1 and 5 by the angles O', B'.

Figure 3:
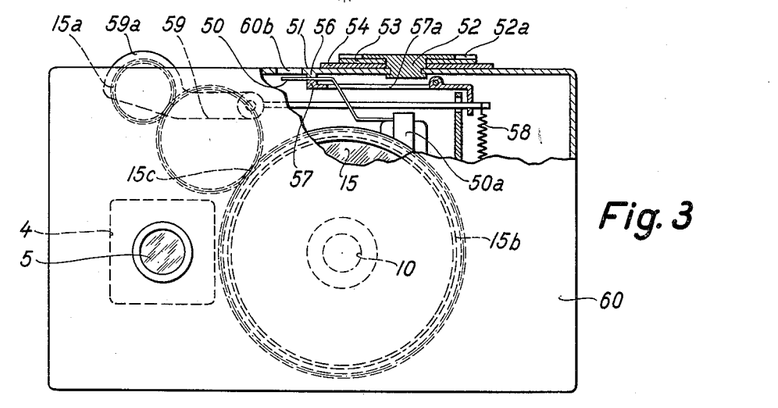

In order to assimilate the brightness of the comparison field M with the brightness of the non-sharp object field O a rotatable gray wedge 15, FIGS. 1 and 3, may be used. The gray wedge may rotate about the axis of the tube 10a and extends between the opening 3 and the mirror element 9b or optical mixing element 9, respectively. By turning an operating wheel 15a, FIGS. 3 and 4, operatively connected with the gray wedge 15 by gear means 15c, the brightness of the comparison field M or the light entering the mirror element 9b, respectively, may be weakened or strengthened. The gray wedge 15 is connected with a scale 15b, FIGS. 1 and 4, which is readable by optical means 15e, 15f in a window 60a of the housing 60. The scale 15b indicates steps of brightness.

Figure 2:
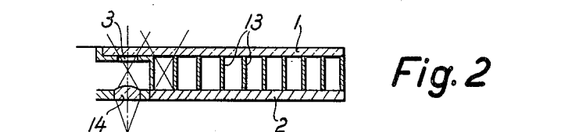

The arrangement may include means within the range of the diffusing glass plate 1 whereby the light which is directed both to the photo cell 2 and to the comparison photometer is limited. For example, as seen in FIG. 2, such limiting means may consist of louvres 13 and a lens 14 may be placed in axial alinement with the opening 3.

Figure 4:
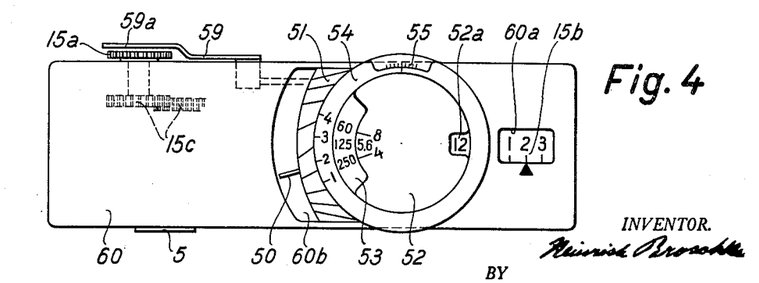

Relating to the photoelectric exposure meter being part of the exposure measuring device, the two scale disks 53 and 54 are frictionally connected and co-axially mounted as shown in FIGS. 3 and 4. The scale disk 53, nearest the fixed scale disk 52, bears a scale indicating time values of exposure. The other scale disk 54 bears a scale indicating values of brightness and these latter values correspond to the steps or values of brightness of the scale 15b of the gray wedge 15 which are visible within the window 60a.

The markings of optically-photometrically measured brightness values on the scale disk 54 serve as follow up pointer for the pointer 50 of the photoelectric meter 50a. The corrected relations between the photographic exposure values are readable in time and diaphragm values on the disks 52 and 53, when that brightness value on the scale disk 54 which corresponds with the optically-photometrically measured brightness value readable in the window 60a has been brought in coincidence with that position of the pointer 50 which has been obtained as a value considering the brightness of the diffusing glass plate 1 during the optical-photometrical measuring of the object brightness. The scale disks 53 and 54 are provided for the consideration of exemption constants such as film sensitivity, filters and the like and may be relatively adjustable. The adjusting may be controlled by markings 55 on the scale disks 53 and 54 and the adjusted value may be read in numbers appearing in the window 52a of the fixed scale disk 52.

Inasmuch as this embodiment of the invention requires that the photo-electrically measured brightness values marked by the strokes of the pointer 50 be corrected by means of the optically-photometrically observed value of the brightness of the object, it is necessary that the instrument pointer 50, visible within the window 60b, be stopped in its stroke position, which it has reached when the instrument is in light measuring position.

This is accomplished by means of two clamping members 56 and 57, FIG. 3. The clamp 56 is fixed. The clamp 57 is formed on the free end of a pivoted lever 57a. Another lever 59 engages the short end of the lever 57a as shown and carries a finger member 59a. The latter lies within the range of the wheel 15a which serves to adjust the gray wedge 15. A spring 58 acts upon the lever 59 to clamp the pointer 50 between the clamping members 56, 57. Before it is possible to operate the wheel 15a for adjusting the gray wedge 15, the finger member 59a has to be pressed down against the force of the spring 58, thereby releasing the pointer 50 from the clamps 56, 57. When the wheel 15a is released, the spring 58 again acts to clamp the pointer 50 in whatever extreme stroke position it has reached.

This exposure measuring device embodying the invention as above described is formed as a pocket instrument. It may be used as a separate instrument or releasably mounted on a camera housing of any type. Its operation and its handling is as follows:

The finder 4, 5 is directed on the object and then there appears in the finder picture field B, FIG. 5, a relatively small bright spot M which is an image of the mirror 9b which is illuminated through the opening 3 and which serves as a comparison surface. Around this comparison spot M appears also a non-sharp picture O of a portion of the object. The size of O is determined by the size of the opening 10 and the size of the ground glass 9a. The non-sharp appearance of O is caused by the direct imaging of a limited portion of the object by the light rays coming in through the opening 10 and reflected upon the matted plate 9a of the optical mixing element 9, FIG. 1.

The spot M and the surrounding portion O are directed by the finder 4, 5 upon that portion of the object which has to be correctly exposed in the final picture. The matted plate 9a causes a diffuse distribution of the brightness of that portion of the object (integral brightness) which is under consideration and which brightness is thereafter photometrically compared with the brightness of the spot M.

The gray wedge 15 is then rotated by operation of the wheel 15a until the brightness of M and O are even. Thus the gray wedge reaches an end position in which it indicates a comparison value of the brightnesses between the brightness of the important portion O of the object to be photographed and the brightness of the diffusing glass plate 1, and which is then used to correct the photoelectrically measured brightness value of said glass plate 1.

During the optical-photometrical determining of the comparison value the pointer 50 of the photoelectrical meter 50a moves freely because the user's finger operating the wheel 15a depresses the finger member 59a and thereby holds open the clamps 56, 57. Thereby, the pointer 50 moves into a position which corresponds to the brightness of the diffusing glass plate 1. After determining the comparison value the user's finger lets go of the wheel 15a and the finger member 59a, whereby the spring 58 acts to clamp the pointer 50 in its stroke position, the pointer 50 then being held stationary in that position by the clamps 56, 57.

The brightness value, for example "2," FIG. 4, appearing in the window 60a, and which is obtained by the adjustment of the gray wedge 15, is then, by using the corresponding number "2" on the rotatable scale disk 54 as a follow up pointer brought in coincidence with the pointer 50 of the instrument 50a, the pointer 50 being held stationary in its stroke position by the clamps 56, 57. The scale disk 53 frictionally connected with the scale disk 54 follows the follow up movement of the latter.

The fixed scale disk 52 shows the camera diaphragm opening values and the corresponding exposure time values may then be read upon the scale disk 53 and thereafter be transferred to the camera exposure adjusting elements.

Figure 6:
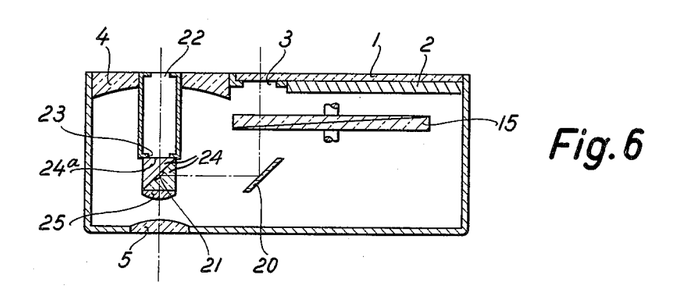
FIG. 6 illustrates another embodiment of the invention like that of FIGS. 1–4 but with a part of the optical photometer directly arranged in the path of the light rays of the picture finder.

FIG. 6 shows another embodiment of the invention in which that part of the optical means by which the non-sharp object view O is obtained and the mirror element forming the comparison spot in the diaphragm 11 are arranged immediately between the finder lenses 4, 5. The photo cell 2 and the entrance opening 3 for comparison light of the optical photometer are arranged behind the light diffusing plate 1. The bundle of light rays which comes from the opening 3 and serves for comparison is reflected into the finder path of light rays by the mirrors 20 and 21, the latter being part of the optical mixing element 24. The size of the mirror 21 determines the size of the comparison light spot M. The finder is provided with a tube 23 having a front opening 22 and a rear opening which is covered with the matted glass surface 24a of the optical mixing element 24. The non-sharp picture of the object appears on the matted glass surface 24a. The arrangement also includes a lens 25 which together with the finder lens 5 forms a magnifying glass for observing the comparison bright spot M within the surrounding field O, FIG. 5. Between the reflecting mirror 20 and the comparison surface in the opening 3 there is again arranged a rotating or slidably operated gray wedge 15 which serves the purpose of assimilating the brightness of the spot M within the brightness of the field O. The arrangement in FIG. 6 is otherwise like that shown in FIG. 5 and is operated in the same manner.

Figure 7:
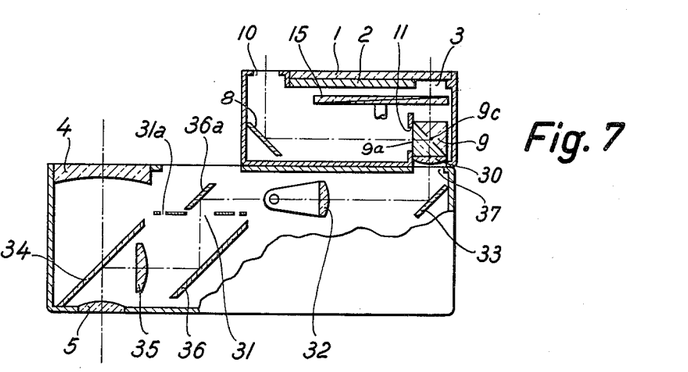
FIG. 7 shows the optical-photoelectric device in an embodiment which includes a range finder.

FIG. 7 illustrates another embodiment of the invention in which the entire exposure measuring device is combined with an existing range finder. In this embodiment the exposure measuring device is formed to fit an existing range finder, which may be a pocket instrument or which may be built into a camera housing. The optical-electrical measuring elements of the exposure meter are in this embodiment formed as a unitary structure arranged to be placed in front of the range finder.

The exposure meter includes the diffusing glass plate 1 with the photo cell 2, the comparison surface in the opening 3, the gray wedge 15, the optical mixing element 9 with the mirror opening 9c and the mat surface glass disk 9a with a limiting diaphragm 11, the opening 10 for the bundle of light rays coming from the selected portion of the object and the reflecting mirror 8.

The mirror opening 9c serves the same purpose as the mirror spot 9b, 21, in FIGS. 1–6 and determines the size of the comparison bright spot M. The instrument 50a with its pointer 50 is not shown but may be like that shown in FIGS. 1–4.

In order to adapt this exposure meter to the optical properties of a range finder or a measuring finder there is provided yet another optical element in the form of a lens 30. The latter is for the purpose of enabling the user to utilize the exposure meter in front of the measuring rays entrance opening 37 of a range finder of usual construction.

Such a range finder of known construction consists for example of a finder 4, 5 with a reflecting mirror 34, a lens 35 in the path of the deflected light rays, the lens 35 together with the ocular lens 5 of the finder 4, 5 forming a magnifying glass for observing an intermediate picture plane 31 within view limiting marks 31a. Further, such a known instrument includes an adjustable objective 32 for deflecting the measuring picture in the intermediate picture plane, also the base end mirror 33 and the light guiding mirrors 36, 36a. The base and mirrors 33 and 34 and the mirrors 36 and 36a form an image erecting system in order to erect the image caused by the real imaging objective 32.

When the parts are assembled as shown in FIG. 7 the non-sharp field O and the comparison field M of the optical photometer will be seen in the finder 4, 5 instead of the measuring picture of the range finder.

In this embodiment of the invention the view finder 4, 5 and the mirror 34 are parts of the range finder. As stated above, the parts constituting the exposure measuring instrument as an entirety is arranged in a unitary structure and as such, as a unit, mounted in front of the light rays entrance opening 37 in the range finder. Instead of this arrangement, one may use a reversible mirror or prism arrangement which either releases the opening 37 in order to measure the range or leads the united bundle of light rays of the optical photometer arrangement into the opening 37 of the range finder.

The photoelectrical exposure meter arrangement of the above stated embodiment may be the same as shown in FIGS. 1–4. Also operation and handling of the optical-photometrical as well as of the photo-electrical exposure meter device is the same as stated above.

These above described arrangements provide a non-sharp object field O for optically-photometrically measuring purposes which field is seen in the finder field B surrounding the centrally disposed bright spot M.

Difficulties in the light measuring operation may however occur when the contrast in light illumination is too strong for correctly measuring the differences between O and M. This may occur when the brightness of the field B outshines the brightness of the field O and of the spot M.

Figure 8:
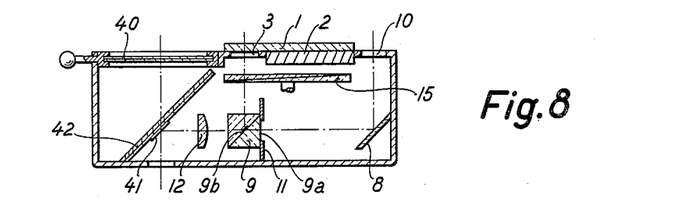
FIGS. 8 and 9 illustrate arrangements in which light weakening means are included in the finder.

In such cases one may use an adjustable polarizer 40, FIG. 8, in the finder opening and an analyzer 42 combined with the mirror 41 the latter reflecting the rays coming from the optical photometer into the finder. By adjusting the polarizer, the brightness of the object field B seen in the finder may be varied to suit.

Figure 9:
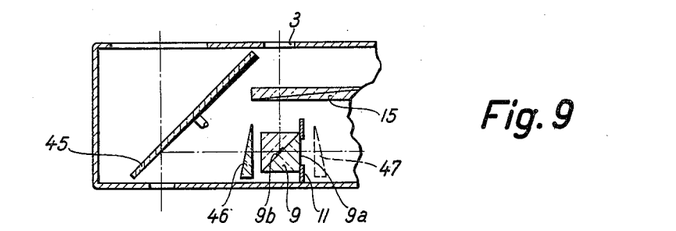

FIG. 9 illustrates another form of light weakening means provided in the finder to vary the brightness of the object field B seen in the finder. The mirror 45, which reflects the photometric fields of view O and M in the path of the finder light rays is made slidable or rotatable and formed as a gray wedge in that the mirror 45 is provided with a stepwise or continually varying transparency. This arrangement possesses the advantage that if the brightness of the finder field B is weakened, the brightness of the comparison fields O and M is increased. If the transparency of the mirror 45 is of continually varying character then it is advantageous to use adjustable gray wedges 46, 47 near the optical mixing element 9. The wedges serve the purpose of compensating for the uneven reflection of the fields O and M, caused by continually varying transparency. The wedges 46, 47 are adjusted when the apparatus is built and require no after adjustment.

The foregoing described embodiments of the invention relate to exposure meter devices in which the optical-photometrically measured brightness value is combined with the photoelectrically measured brightness value under the control of the vision of the photographer. However, in these arrangements it is possible to couple the gray wedge adjusting means of the optical photometer with the follow up pointer of the photoelectric exposure meter as well as the follow up pointer of the electric exposure meter to the corresponding exposure adjusting elements in a photographic camera or cinemaphotographic camera. The first mentioned coupling transfer is done by simple gear means the second means of a differential mechanism having means for adjusting the time and diaphragm adjusting elements of the camera.

FIGS. 10–15 illustrate schematically mechanisms in which the means for adjusting the gray wedge is coupled with the electric exposure meter in such a manner that the value of brightness ascertained with the optical photometer device is automatically transferred to the photoelectric exposure meter mechanism. The value scale of brightness 15b, FIG. 1, of the gray wedge 15 may then be dispensed with.

FIGS. 12–15 illustrate schematically mechanisms in which the follow up pointed means of the photoelectric exposure meter is coupled with the exposure adjusting means of a camera. Only the coupling means are shown and described. The optical and photoelectrical means of the exposure measuring device as well as its operating and handling for measuring purpose may be the same as shown and described in the foregoing embodiments.

Figure 10:
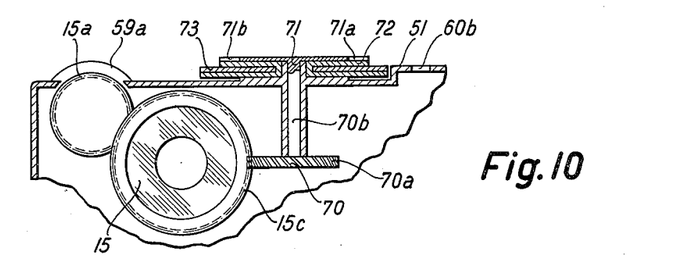
FIGS. 10 and 11 illustrate an arrangement in which an adjustable gray wedge of the optical photometer is coupled with parts of the electric exposure meter.
Figure 11:
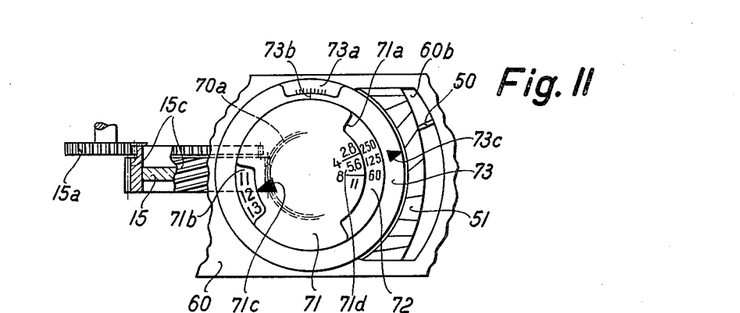

FIGS. 10 and 11 illustrate an embodiment of the invention in which the means for adjusting the gray wedge 15 is coupled with the photoelectric exposure meter. The gray wedge is adjustable into different positions by operation of the wheel 15a. The gear means 15c of the gray wedge 15 meshes with the teeth 70a of another gear 70. The latter is fast on a shaft 70b which also carries an uppermost or forefront scale disk 71 having two windows 71a and 71b. The scale disk 71 is a scale disk of the photoelectric exposure meter, see FIG. 3, and may carry a camera diaphragm opening scale 71d.

Behind the scale disk 71 there is arranged a second rotatable scale disk 72 which is frictionally connected with a third scale disk 73. The scale disk 72 carries scales of time values and brightness or light values which are read in the windows 71a and 71b of the disk 71. The arrangement is such that the scale of time values are seen opposite the diaphragm values on the scale disk 71.

The scale disk 72 also carries a film sensibility-degrees scale which is visible in the window 73a of the scale disk 73. The sensibility-degree scale is readable in relation to the mark 73b on the disk 73. The scale disk 73 carries a mark 73c which serves as a follow up pointer which is movable by means of the leading scale 51 into alinement with the instrument pointer 50. The pointer 50 is visible in the window 60b of the housing 60.

When the follow up pointer 73c has been set with reference to the instrument pointer 50, the time values on the scale disk 72 corresponding to the diaphragm values on the scale disk 71 can be read with reference to the corresponding diaphragm values 71d. The light values visible in the window 71b may be read also by means of a further mark 71c on the scale disk 71. The optical-photometrical and the photoelectrical means as well as the operation of this arrangement is otherwise like that described in connection with FIGS. 1–9.

Inasmuch as the adjusting means of the gray wedge is coupled with the diaphragm scale 71 of the photoelectric exposure meter, the operation of the optical-photometric mechanism causes automatically the corresponding adjustment of the scale disk 71 which shows the diaphragm values 71d. The time values on the scale disk 72 will be alined with the corresponding diaphragm values 71d on the scale disk 71 by moving the mark 73c into alinement with the instrument pointer 50.

Figure 12:
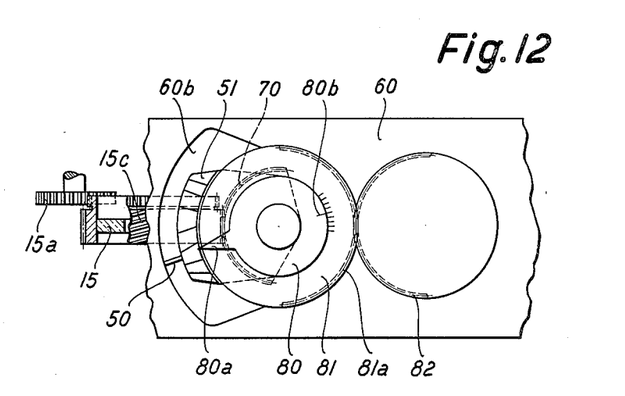
FIGS. 12 and 13 illustrate a device embodying the invention in which the device is coupled with the camera exposure adjusting elements.
Figure 13:
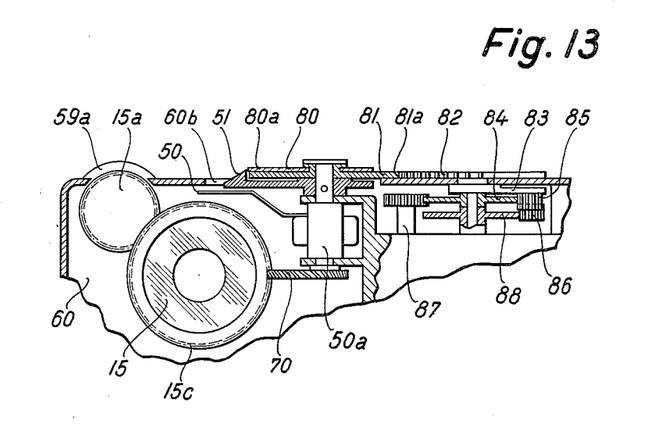

FIGS. 12 and 13 illustrate an embodiment of the invention—built into a photographic camera—in which the adjustment of the gray wedge 15 is mechanically transferred onto the photoelectric meter 50a and the follow up pointer means of the photoelectric meter 50a is coupled with the exposure adjustment means of a camera. Otherwise, the optical-photometrical and the photoelectrical means for measuring and its operation are the same as described in FIGS. 1–9.

The rotary adjustment of the gray wedge 15 of the optical photometer causes a rotary adjustment of the photoelectric meter 50a including the leading scale 51. This embodiment provides a scale disk 80 with a follow up pointer 80a mounted coaxial with the measuring mechanism and operating in conjunction with the leading scale 51. The scale disk 80 is frictionally connected with a film-sensibility-scale disk 81 and adjusted with reference to the scale disk 81 by means of a pointer mark 80b. The sensibility-scale disk 81 has a gear 81a which meshes with another gear 82. The latter gear 82 is part of a differential mechanism 83—86. The differential mechanism transfers the adjusting movement of the follow up pointer 80a to the element 87 for adjusting the camera diaphragm or to the element 88 for adjusting the time setting mechanism of a camera, one of the exposure adjusting elements being predetermined and preset in considering the most important exposure factor for obtaining the desired view.

The transfer of the optically-photometrically measured values to the electrical exposure meter is as follows. The rotary adjustment of the optical gray wedge 15 is caused by operation of the knob 15a as above described. Simultaneously therewith and by means of the meshing gears 15c and 70 the photoelectric meter 50a including the pointer 50 and the leading scale 51 is adjusted.

The window 60b in the housing 60 is so placed that the leading scale 51 of the photoelectric exposure meter together with the entire range of the stroke of the pointer 50 remain visible as a unitary adjustment range of the photoelectric meter 50a.

The pointer 50 of the photoelectric exposure meter is again arrested in its end-stroke position after the finish of the optical-photometric measuring movement. The correct positions of the camera diaphragm and the camera time setting elements are then obtained by alining the follow up pointer 80a with the pointer 50, the follow up movement is transferred on the non-preset exposure adjusting element of the camera.

The numerical scales for visibly indicating the single measuring results are no longer required in the exposure measuring device, but may of course be consulted on the exposure adjusting elements of the camera to check the results of the operation.

Figure 14:
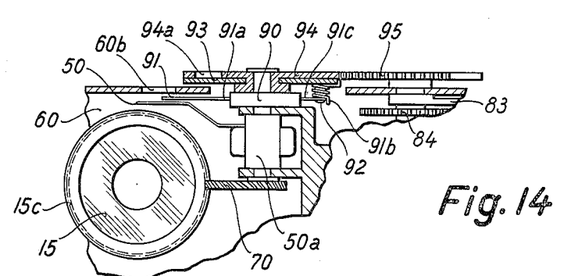
FIGS. 14 and 15 illustrate still another embodiment of the invention in which an adjustable gray wedge of the optical photometer is coupled with parts of the photoelectric exposure meter, the latter being coupled with the camera exposure adjusting means, and including mechanical equalizing means for considering the non-linear characteristics of the pointer movements of the photoelectric exposure meter.
Figure 15:
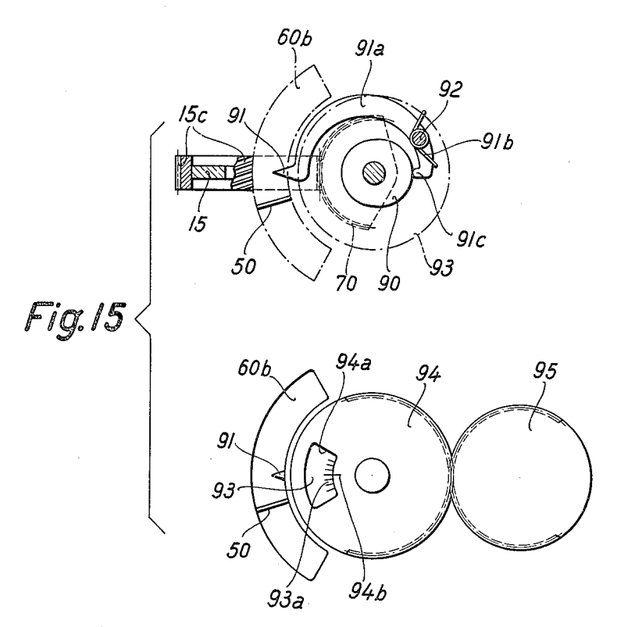

The embodiment illustrated in FIGS. 14 and 15 refers also to a measuring device built into a camera. It also includes a coupling arrangement between the rotary adjustment of the gray wedge 15 and the rotatable photoelectric meter 50a. The latter, in this arrangement, includes a cam disk 90 which rotates with the rotary movement of the photoelectric meter 50a. A follow up pointer 91, which cooperates with the instrument pointer 50, is formed at the free end of a lever 91a which is swingably pivoted at 92. The pivot 92 of the lever is supported on a turntable 93 which is frictionally connected with a gear 94. The latter meshes with another gear 95. The gear 95 corresponds to the gear 82 of the embodiment according to FIGS. 12 and 13 and forms connection with the differential mechanism 83—86 for adjusting the adjusting elements in the camera in the same manner as described in connection with the embodiment illustrated in FIGS. 12 and 13. The lever 91a is formed with a cam nose 91c which is held on the cam 90 by a spring 91b.

To consider additional photographic factors such as sensitivity of the film, filters or the like relative adjustment between the frictionally connected disk 93 and gear 94 is provided by a relative movement between the adjustable scale 93a on the turntable 93 and a pointer 94b on the gear 94, the scale 93a being visible in the window 94a.

In this embodiment the cam controlled movement of the follow up pointer 91 is provided for the purpose of exercising the equalization function of the leading scale 51 and whereby the latter is no longer required. The measuring and adjusting operation of this embodiment is similar to that described in connection with FIGS. 12 and 13.

I claim:

1. A photographic exposure meter device for determining the requisite illumination for the photographic taking of pictures comprising, in combination, an optical comparison photometer for determining the light value of the object to be photographed, a photoelectric exposure meter for photoelectrically determining the ambient brightness, a picture finder for observing the object to be photographed, optical means in said picture finder for viewing the field of view of said optical comparison photometer in the path of the finder bundle of light rays, optical means in said optical comparison photometer for producing a non-sharp image of predetermined size of a portion of the object in the field of view of the comparison photometer concentric with the comparison light spot of the comparison photometer, light weakening means in said comparison photometer, means in said photoelectric exposure meter for holding and releasing the pointer of the photoelectric instrument in its indicating position in response to the measuring operation of said optical comparison photometer, and means for illuminating uniformly the comparison surface of the comparison photometer and the photo cell of the photoelectrical exposure meter.

2. A photographic exposure meter device as defined in claim 1 said optical means in said optical comparison photometer, for producing a non-sharp image comprising a mat surface for creating a non-sharp part-picture and an illuminated mirror element in the measuring field serving as a comparison surface which is smaller than the surrounding not-sharp object field and the latter smaller than the surrounding field of view of the finder each of them by a multiple of the sizes thereof.

3. A photographic exposure meter device as defined in claim 1 said optical means in said picture finder including means for optically combining the light paths of the comparison light rays with the picture finder light rays, and further including an optical mixing element with a mat surface and a small mirror element both included in the path of the picture finder light rays.

4. A photographic exposure meter device as defined in claim 1 including light weakening means in the path of the said picture finder bundle of light rays.

5. A photographic exposure meter device as defined in claim 1 said optical means in said picture finder including path of the bundle of light rays in the picture finder.

6. A photographic exposure meter device as defined in claim 1 said optical means in said picture finder including a transparent mirror of continually variable transparency in the path of the finder light rays for optically combining therewith the rays in the field of view of the comparison photometer and including compensation light weakening means positioned in the path of the light rays of said comparison photometer.

7. A photographic exposure meter device as defined in claim 1 said last mentioned means including a lighting diffusing glass plate for illuminating the comparison surface of the optical photometer and the photo cell of the photoelectrical exposure meter to the same extent.

8. A photographic exposure device as defined in claim 1 said means for holding and releasing the pointer of the photoelectric instrument including clamping means for the photoelectric instrument pointer to clamp the instrument pointer when not operating said light weakening means of said optical photoemeter.

9. A photographic exposure meter device as defined in claim 1 further comprising scale means and coupling means between said light weakening means of said optical photometer and the scale means.

10. A photographic exposure device comprising in combination, a photographic camera picture finder; a photographic camera range finder having a measuring opening; a unitary structure of an optical comparison photometer for determining the light value of the object to be photographed, a photoelectric exposure meter for photoelectrically determining the ambient brightness, optical means in said photometer for producing a non-sharp image of pre-determined size of a portion of the object of a field of the view of the comparison photometer concentric with the comparison-light spot of the comparison photometer, light weakening means in said comparison photometer, means in said photoelectric exposure meter for holding and releasing the pointer of the photoelectric instrument in its indicating position in response to the measuring operation of said optical comparison photometer, and means for illuminating uniformly the comparison surface of the comparison photometer and the photocell of the photoelectric exposure meter; said unitary structure being mounted in front of the measuring opening of the said range finder; and optical means for adapting said unitary structure to the optical means in said picture finder and said camera range finder.

11. A photographic device including a photographic exposure meter and diaphragm exposure adjustment means for a camera, comprising, in combination an optical comparison photometer for determining the light value of the object to be photographed; a photoelectric exposure meter for photoelectrically determining the ambient brightness; a picture finder for observing the object to be photographed; optical means in said picture finder for viewing the field of view of said optical comparison photometer in the path of the finder bundle of light rays; optical means in said optical comparison photometer for producing a non-sharp image of predetermined size of a portion of the object in the field of view of the comparison photometer concentric with the comparison light spot of the comparison photometer; adjustable light weakening means in said comparison photometer; coupling means between said light weakening means and said photoelectric meter; scale means for use as a follow-up pointer of said photoelectric meter; coupling means for operatively connecting said scale means and one of said diaphragm and exposure adjusting means; means in said photoelectric meter for holding and releasing said pointer in its indicating position in response to the measuring operation of said optical comparison photometer; and means for illuminating uniformly the comparison surface of the comparison photometer and the photocell of the photoelectric cell of the exposure meter.

12. A photographic device including a photographic exposure meter and diaphragm and exposure adjustment means for a camera, comprising, in combination an optical comparison photometer for determining the light value of the object to be photographed; a photoelectric exposure meter for photoelectrically determining the ambient brightness; a picture finder for observing the object to be photographed; optical means in said picture finder for viewing the field of view of said optical comparison photometer in the path of the finder bundle of light rays; optical means in said optical comparison photometer for producing a non-sharp image of predetermined size of a portion of the object in the field of view of the comparison photometer concentric with the comparison light spot of the comparison photometer; adjustable weakening means in said comparison photometer; coupling means between said light weakening means and said photoelectric meter; scale means for use as a follow-up pointer of said electric meter; differential coupling means for operatively connecting said scale means and one of said diaphragm and exposure adjusting means; means in said photoelectric meter for holding and releasing said pointer in its indicating position in response to the measuring operation of said optical comparison photometer, and means for illuminating uniformly the comparison surface of the comparison photometer and the photocell of the photoelectric cell of the exposure meter.

13. A photographic exposure meter device as defined in claim 12 the photoelectric meter of which is rotatable and is coupled with the adjustable compensating light weakening means of said optical photometer, said photoelectric meter comprising cam means coacting with the follow up pointer for compensation of the non linear characteristic of the movement of the instrument pointer.

References Cited in the file of this patent

UNITED STATES PATENTS

| | | |
|---|---|---|
| 2,143,500 | Smethurst et al. | Jan. 10, 1939 |
| 2,183,217 | Goldsmith | Dec. 12, 1939 |
| 2,478,406 | Lamb | Aug. 9, 1949 |

FOREIGN PATENTS

| | | |
|---|---|---|
| 757,898 | France | Oct. 16, 1933 |